United States Patent Office 2,952,701
Patented Sept. 13, 1960

2,952,701

ORGANOPHOSPHORUS DERIVATIVES OF 2,2-DIMETHYL-1,3-PROPANEDIOL

Richard L. McConnell and Harry W. Coover, Jr., Kingsport, Tenn., assignors to Eastman Kodak Company, Rochester, N.Y., a corporation of New Jersey No Drawing. Filed Apr. 15, 1957, Ser. No. 652,691

10 Claims. (Cl. 260—461)

This invention relates to new organophosphorus compounds and to a method for producing said compounds. In a specific aspect, this invention relates to new organophosphorus compounds that are derivatives of 2,2-dimethyl-1,3-propanediol and to a method for producing said compounds.

The compounds within the scope of this invention correspond to the following structural formulas:

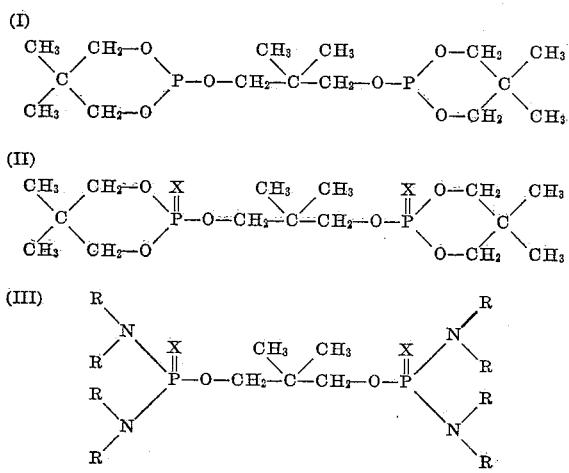

wherein X is selected from the group consisting of oxygen and sulfur and R is a lower alkyl radical containing 1 to 4 carbon atoms.

The compounds of this invention are prepared by reacting certain organophosphorus compounds with 2,2-dimethyl-1,3-propanediol. The organophosphorus compounds for the reaction are selected from the group consisting of phosphorus trichloride, phosphorus oxychloride, thiophosphoryl chloride and bis (dialkyl amido) chlorophosphates wherein the alkyl groups contain from 1 to 4 carbon atoms.

The reaction temperature is ordinarily within the range of 0 to 150° C. and, in some instances, it is unnecessary to exceed room temperature. The reaction time can be varied over relatively wide limits and the reaction period is usually within the range of 1 to 16 hours. Although the reaction can be carried out in the absence of solvents, it is sometimes desirable to employ a solvent reaction medium. Among the solvents that can be employed are dioxane, normally liquid paraffinic and aromatic hydrocarbons, for example, hexane, heptane, benzene, toluene and the like, and their chlorinated derivatives.

For the reaction of 2,2-dimethyl-1,3-propanediol and phosphorus oxychloride, thiophosphoryl chloride or a bis (dialkyl amido) chlorophosphate, it is ordinarily necessary to employ a hydrogen chloride acceptor in the reaction medium. If a hydrogen chloride acceptor is not employed, the reaction may proceed to the formation of products other than the desired compounds. When phosphorus trichloride is one of the reactants, it is preferred, however, to carry out the reaction without the use of a hydrogen chloride acceptor. When a hydrogen chloride acceptor is not employed, in a reaction involving phosphorus trichloride, the reaction proceeds to the formation of the desired product in substantial yields. However, when a hydrogen chloride acceptor is employed in the reaction medium, we also obtain substantial amounts of 2,2-dimethyl-1,3-propanediol cyclic hydrogen phosphite. Among the hydrogen chloride acceptors that can be used in the practice of this invention, are the nitrogen-containing bases such as pyridine, picolines and the like.

The ratio of reactants can be varied within rather wide limits. To produce compounds I and II, the molar ratio of diol to organophosphorus compound is preferably 3:2, and to produce compound III, the molar ratio of diol to organophosphorus compound is preferably 1:2. However, it will be realized that other ratios can be used without departing from the scope of the invention.

The organophosphorus compounds within the scope of this invention are useful as flameproofing plasticizers, stabilizers, synthetic lubricants, force transmission fluids, lubricating oil additives, pesticides and intermediates for the preparation of other organophosphorus compounds. The compounds of this invention are remarkably stable. For example, they are much more stable to hydrolysis than the simple trialkyl phosphites or phosphates.

The following examples illustrate this invention.

EXAMPLE 1

2,2-dimethyl-1,3-propanediol cyclic hydrogen phosphite

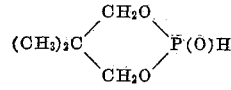

and 2,2-dimethyl-1,3-propanediol bis(2,2-dimethyl-1,3-propanediol cyclic phosphite)

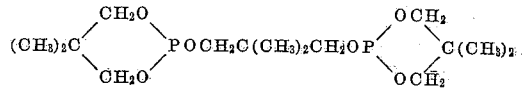

364 g. of 2,2-dimethyl-1,3-propanediol were dissolved in 1500 ml. of anhydrous dioxane. After adding 474 g. of pyridine, 274 g. of phosphorus trichloride were added dropwise with stirring while the reaction vessel was cooled externally with an ice bath. After all the phosphorus trichloride had been added, the reaction mixture was stirred at room temperature for 5 hours. The pyridine hydrochloride was filtered off and the filtrate was distilled under vacuum. After removing a small amount of unreacted 2,2-dimethyl-1,3-propanediol, 45 g. of 2,2-dimethyl-1,3-propanediol cyclic hydrogen phosphite boiling at 140–145° C. at 2.2–2.5 mm. were obtained. This material crystallized upon cooling and melted at 45–48° C. When a sample of this cyclic hydrogen phosphite was reacted with chlorine in a chloroform solution, 2,2-dimethyl-1,3-propanediol cyclic chlorophosphate was obtained.

The next fraction boiled at 165–177° C. at 2.5 mm. and amounted to 136 g. This product was 2,2-dimethyl-1,3-propanediol bis(2,2-dimethyl-1,3-propanediol cyclic phosphite), $n_D^{20}$ 1.4685. This material crystallized after standing for several weeks to a waxy solid. This latter product in 0.5% concentration decreased the viscosity breakdown of polyesters during extrusion. In combination with benzophenone type light stabilizers such as Uvinul 490, it prevented formation of the yellow color which is obtained when Uvinul 490 is used alone in polyesters.

EXAMPLE 2

*2,2-dimethyl-1,3-propanediol bis(2,2-dimethyl-1,3-propanediol cyclic phosphite)*

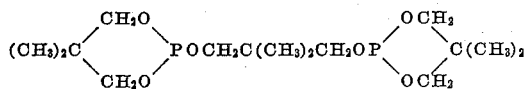

This reaction was run exactly like Example 1 except no pyridine was used. A good yield was obtained and the product boiled at 181–190° C. at 2.2 mm.

EXAMPLE 3

*2,2-dimethyl-1,3-propanediol bis(2,2-dimethyl-1,3-propanediol cyclic phosphate)*

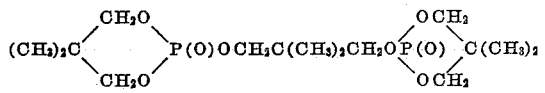

31.2 g. of 2,2-dimethyl-1,3-propanediol and 47 g. of pyridine were dissolved in 300 ml. of dry dioxane. After adding 30.6 g. of phosphorus oxychloride dropwise with stirring, the solution was refluxed for 8 hours. The pyridine hydrochloride was filtered off and the solvent removed under reduced pressure. The semisolid yellow material which was obtained was dissolved in benzene and washed well with water. After drying the benzene solution over sodium sulfate, the solvent was removed yielding a white crystalline solid.

EXAMPLE 4

*2,2-dimethyl-1,3-propanediol bis (2,2-dimethyl-1,3-propanediol cyclic thiophosphate)*

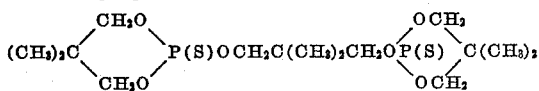

This product was obtained by the reaction of 31.2 g. of 2,2-dimethyl-1,3-propanediol and 33.9 g. of thiophosphoryl chloride according to the procedure of Example 3.

This compound was also prepared by the reaction of 3.2 g. of sulfur with 18.4 g. of 2,2-dimethyl-1,3-propanediol bis(2,2-dimethyl-1,3-propanediol cyclic phosphite) in benzene. The reaction is slightly exothermic. After this heat of reaction had subsided, the reaction mixture was refluxed gently on the steam bath until all of the sulfur had reacted. Evaporation of the benzene left the product as a cream colored solid.

EXAMPLE 5

*Tetrakis (dimethylamido) 2,2-dimethyl-1,3-propanediol bis phosphate*

This product was obtained by the reaction of 31.2 g. of 2,2-dimethyl-1,3-propanediol and 102.0 g. of bis(dimethylamido) chlorophosphate in the presence of 55.3 g. of pyridine dissolved in 300 ml. of dry dioxane. After stirring the reaction mixture for 2 hours at room temperature, the pyridine hydrochloride was removed by filtration and the filtrate was fractionated to obtain the above product.

The products described in Examples 1–5 are good plasticizers for cellulose acetate and are compatible with most natural and synthetic polymers. Cellulose acetate films or plastic sheets containing 15 to 30 parts of these 2,2-dimethyl-1,3-propanediol derivatives are self-extinguishing. The utility of these products is demonstrated by the following examples.

EXAMPLE 6

2,2-dimethyl-1,3-propanediol bis(2,2 - dimethyl - 1,3-propanediol cyclic phosphite) greatly reduces the viscosity breakdown of polyesters during extrusion. It also improves the polymer color when a light stabilizer is used such as Uvinul 490 (2,2'-dihydroxy-4,4'-dimethoxybenzophenone). Extruded polyester film (30-mil thickness) containing 2 parts Uvinul 490 has a deep yellow color; however, a similar film which contains 0.5 part of the above cyclic bisphosphite in addition to the Uvinul 490 has only a very slight yellow tint. The data in the following table were obtained on a polyester derived from pentanediol and 4,4'-sulfonyldibenzoic acid (inherent viscosity of polyester at 25° C. before extrusion was 0.98 as determined at 0.23% concentration in 60% phenol/40% tetrachloroethane by weight.)

| Additive | Inherent viscosity at 25° C. after extrusion | Color |
|---|---|---|
| (1) None | 0.82 | Transparent, colorless. |
| (2) 2 parts Uvinul 490 | 0.73 | Transparent, deep yellow. |
| (3) 0.5 part cyclic bisphosphite. | 0.81 | Transparent, colorless. |
| (4) 2 parts Uvinul 490 plus 0.5 part cyclic bisphosphite. | 0.81 | Transparent, slight yellow tint. |
| (5) 1 part cyclic bisphosphite | 0.81 | Transparent, colorless. |
| (6) 2 parts cyclic bisphosphite | 0.84 | Do. |

This cyclic bisphosphite is also compatible with other polymeric materials, e.g., cellulose acetate, cellulose acetate butyrate, polyvinyl chloride, and polyethylene terephthalate.

EXAMPLE 7

2 g. of cellulose acetate powder and 18 ml. of acetone were placed in a screw cap vial and agitated until a smooth, transparent dope was obtained. Then 0.5 g. of 2,2-dimethyl-1,3-propanediol bis(2,2-dimethyl-1,3 - propanediol cyclic phosphate) was added and agitated until it had dissolved. This dope was poured on a glass plate and a thin film prepared with a doctor blade. When the acetone had evaporated, the transparent, well plasticized film was removed from the plate and heated in an oven at 85° C. for 30 minutes to remove any residual acetone. The flame resistance of this film was measured by clamping a strip of film (0.5″ x 6″) horizontally in a draft free burning shield. A piece of wire gauze was clamped just below the strip of film. After igniting the end of the film with a burning splint, the number of relights or the time required to consume the film are noted. Six relights were required to completely consume samples of the above-described film while cellulose acetate film plasticized with a conventional plasticizer such as diethyl phthalate was completely consumed with only one ignition in 25 seconds. The compounds of Examples 4 and 5 had similar flameproofing action.

We claim:

1. As a composition of matter, organophosphorus compounds selected from the group consisting of those having the following structural formulas:

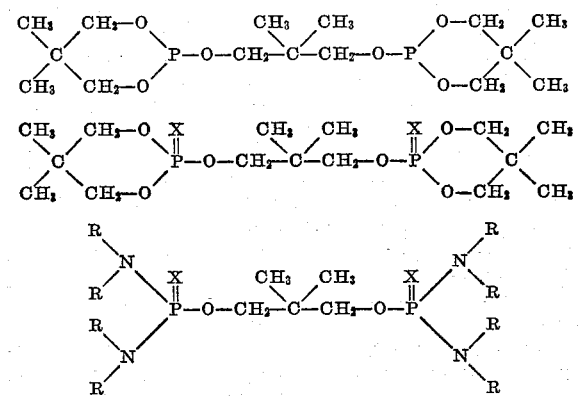

wherein X is selected from the group consisting of oxygen and sulfur and R is a lower alkyl radical containing 1 to 4 carbon atoms.

2. As a composition of matter, the compound having the formula:

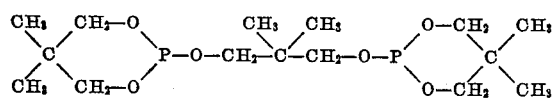

3. As a composition of matter, the compound having the formula:

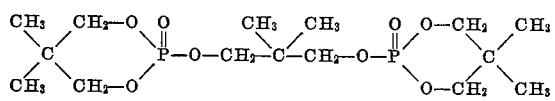

4. As a composition of matter, the compound having the formula:

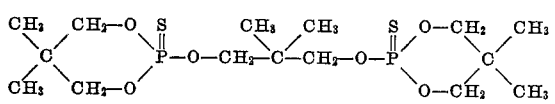

5. As a composition of matter, the compound having the formula:

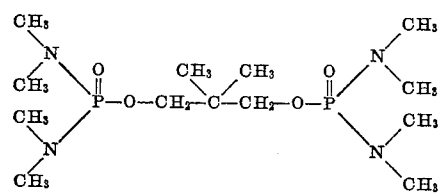

6. The method for producing new organophosphorus compounds which comprises reacting 2,2-dimethyl-1,3-propanediol with a compound selected from the group consisting of phosphorus trichloride, phosphorus oxychloride, thiophosphoryl chloride, and bis (dialkyl amido) chlorophosphates wherein the alkyl groups contain from 1 to 4 carbon atoms at a temperature within the range of 0 to 150° C. in the presence of a nitrogen-containing hydrogen chloride acceptor when one of phosphorus oxychloride, thiophosphoryl chloride and bis(dialkyl amido) chlorophosphates is a reactant, to produce a compound selected from the group consisting of those having the following structural formulas:

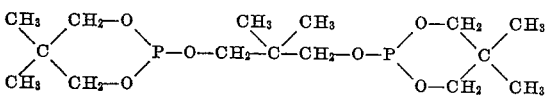

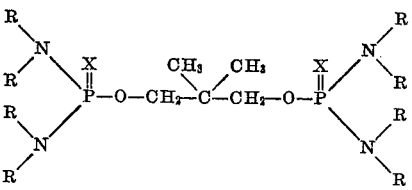

7. The method of producing the compound having the structural formula:

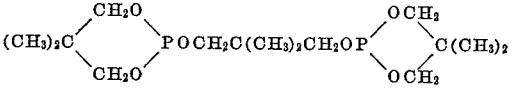

which comprises reacting 2,2-dimethyl-1,3-propanediol with phosphorus trichloride in the absence of any nitrogen-containing hydrogen chloride acceptor at a temperature within the range of 0 to 150° C.

8. The process for producing the compound having the structural formula:

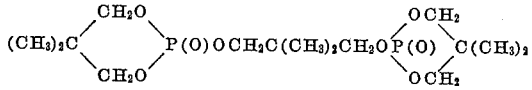

which comprises reacting 2,2-dimethyl-1,3-propanediol with phosphorus oxychloride in the presence of pyridine at a temperature within the range of 0 to 150° C.

9. The process for producing the compound having the structural formula:

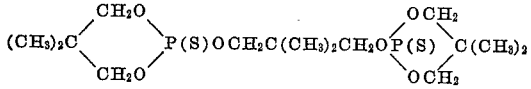

which comprises reacting 2,2-dimethyl-1,3-propanediol with thiophosphoryl chloride in the presence of pyridine at a temperature within the range of 0 to 150° C.

10. The process for producing the compound having the structural formula:

[(CH$_3$)$_2$N]$_2$P(O)OCH$_2$C(CH$_3$)$_2$CH$_2$OP(O)[N(CH$_3$)$_2$]$_2$ which comprises reacting 2,2-dimethyl-1,3-propanediol with bis (dimethyl amido) chlorophosphate in the presence of pyridine at a temperature within the range of 0 to 150° C.

References Cited in the file of this patent

UNITED STATES PATENTS

| | | |
|---|---|---|
| 2,661,365 | Gamrath et al. | Dec. 1, 1953 |
| 2,728,789 | Morris et al. | Dec. 27, 1955 |
| 2,841,608 | Hechenbleikner et al. | July 1, 1958 |
| 2,859,086 | Feild et al. | Nov. 4, 1958 |

FOREIGN PATENTS

| | | |
|---|---|---|
| 766,566 | Great Britain | Jan. 23, 1957 |